(12) United States Patent
Taki

(10) Patent No.: US 12,109,590 B2
(45) Date of Patent: Oct. 8, 2024

(54) ULTRASONIC DEVICE

(71) Applicant: TDK CORPORATION, Tokyo (JP)

(72) Inventor: Tatsuya Taki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 646 days.

(21) Appl. No.: 17/399,319

(22) Filed: Aug. 11, 2021

(65) Prior Publication Data

US 2022/0048073 A1 Feb. 17, 2022

(30) Foreign Application Priority Data

Aug. 17, 2020 (JP) .................................. 2020-137414

(51) Int. Cl.
*B06B 1/06* (2006.01)
(52) U.S. Cl.
CPC .................................. *B06B 1/0681* (2013.01)
(58) Field of Classification Search
CPC .................................................... B06B 1/0681
See application file for complete search history.

(56) References Cited

U.S. PATENT DOCUMENTS

| 2003/0121331 | A1* | 7/2003 | Mitsuoka | G10K 9/122 73/632 |
| 2011/0290028 | A1* | 12/2011 | Matsumoto | G10K 9/122 73/658 |
| 2011/0290584 | A1* | 12/2011 | Sato | G10K 9/122 310/326 |
| 2012/0286626 | A1* | 11/2012 | Matsuo | G10K 9/122 310/322 |
| 2013/0215722 | A1* | 8/2013 | Wu | G10K 9/122 367/188 |
| 2022/0048073 | A1* | 2/2022 | Taki | G01S 7/521 |

FOREIGN PATENT DOCUMENTS

| CN | 102726064 A | 10/2012 |
| JP | H06-253396 A | 9/1994 |
| JP | 2004-260239 A | 9/2004 |
| JP | 2011-250328 A | 12/2011 |
| JP | 2012-010312 A | 1/2012 |

* cited by examiner

*Primary Examiner* — Bryan P Gordon
(74) *Attorney, Agent, or Firm* — Oliff PLC

(57) ABSTRACT

An ultrasonic device includes a case, a piezoelectric element, a sound absorbing material, and a vibration-proof material. The case defines a housing space. The piezoelectric element is disposed in the housing space. The sound absorbing material is disposed on the piezoelectric element and is made of a foaming material. The vibration-proof material is disposed around the sound absorbing material and is in contact with an inner face of the case. Between the piezoelectric element and the sound absorbing material, a first space is formed.

19 Claims, 9 Drawing Sheets

ULTRASONIC DEVICE

TECHNICAL FIELD

The present disclosure relates to an ultrasonic device.

BACKGROUND

A known ultrasonic transceiver includes a housing case, a piezoelectric vibration element disposed in the housing case, a soundproofing filling material, such as felt, disposed on the piezoelectric vibration element, and sealing insulating resin, such as silicon resin, that seals the housing case (see, for example, Japanese Unexamined Patent Publication No. 2004-260239).

SUMMARY

Ultrasonic devices are required to further reduce reverberation of ultrasonic components. However, it is difficult for the known ultrasonic device described above to sufficiently reduce reverberation of ultrasonic components.

A purpose of one aspect of the present disclosure is to provide an ultrasonic device that further reduces reverberation of ultrasonic components.

An ultrasonic device according to one aspect includes a case, a piezoelectric element, a sound absorbing material, and a vibration-proof material. The case defines a housing space. The piezoelectric element is disposed in the housing space. The sound absorbing material is disposed on the piezoelectric element and is made of a foaming material. The vibration-proof material is disposed around the sound absorbing material and is in contact with an inner face of the case. Between the piezoelectric element and the sound absorbing material, a first space is formed.

In the one aspect, since the first space is formed between the piezoelectric element and the sound absorbing material, reverberation of ultrasonic components is not directly transmitted from the piezoelectric element to the skeleton of the sound absorbing material. Accordingly, it is possible to further reduce reverberation of the ultrasonic components.

The one aspect may further include a substrate disposed in the housing space in such a way as to be opposed to the piezoelectric element via the sound absorbing material and electrically connected to the piezoelectric element. Between the substrate and the sound absorbing material, a second space may be formed. In this case, reverberation of the ultrasonic components is not directly transmitted from the skeleton of the sound absorbing material to the substrate. Accordingly, it is possible to further reduce reverberation of the ultrasonic components.

The one aspect may further include a damping material disposed in the first space in such a way as to be separated from the sound absorbing material. In this case, reverberation of the ultrasonic components is further reduced by the damping material.

In the one aspect, the piezoelectric element is positioned inside an outer edge of the sound absorbing material when viewed from a thickness direction of the piezoelectric element. In this case, reverberation of the ultrasonic components is further reduced.

In the one aspect, the sound absorbing material may protrude toward the piezoelectric element from the vibration-proof material in a thickness direction of the piezoelectric element. In this case, the surface area of the sound absorbing material exposed from the vibration-proof material is increased, and reverberation of the ultrasonic components is further reduced.

DETAILED DESCRIPTION

Hereinafter, an embodiment of the present disclosure will be described in detail with reference to the accompanying drawings. Note that, the same reference signs are assigned to the same elements or elements having the same function in the description, and the redundant description will be omitted.

Figure 1:
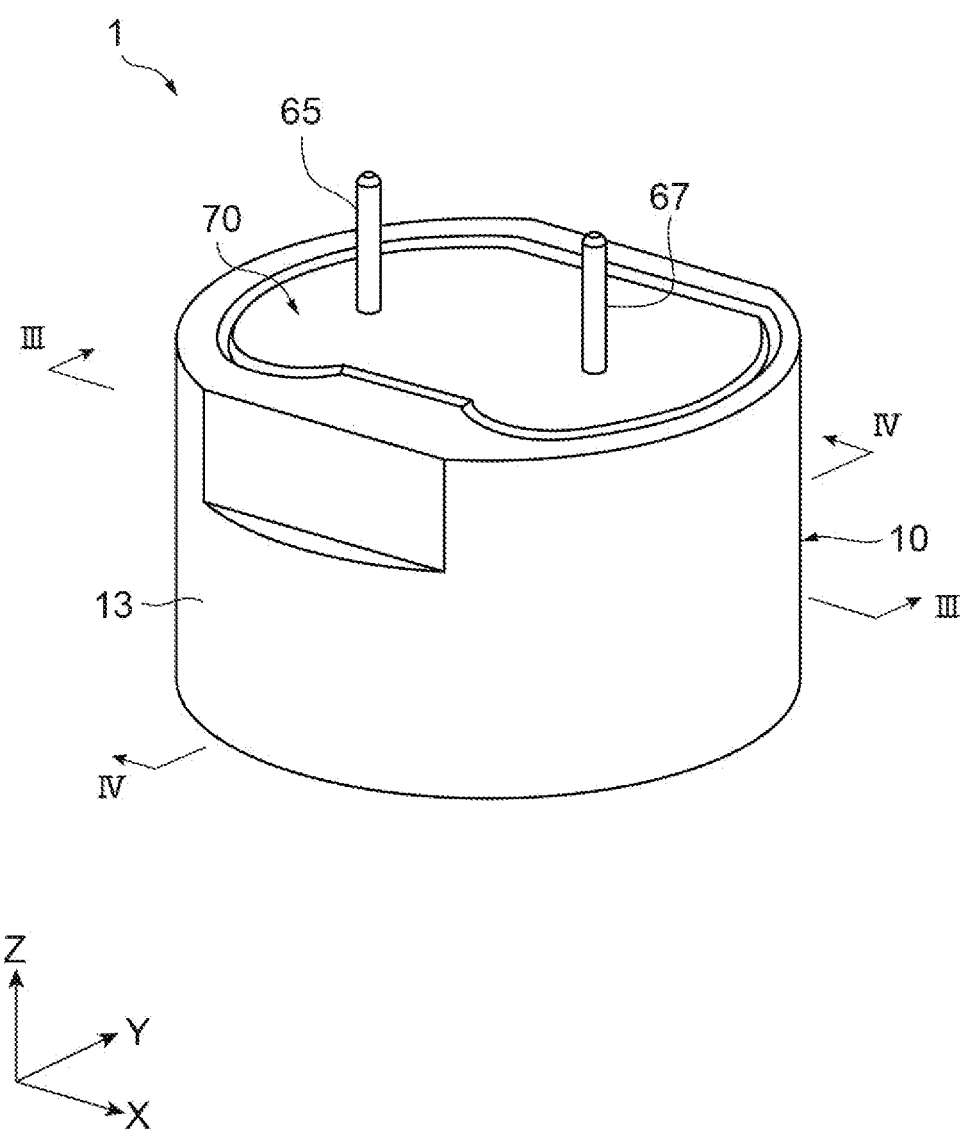
FIG. 1 is a perspective view of an ultrasonic device according to an embodiment.
Figure 2:
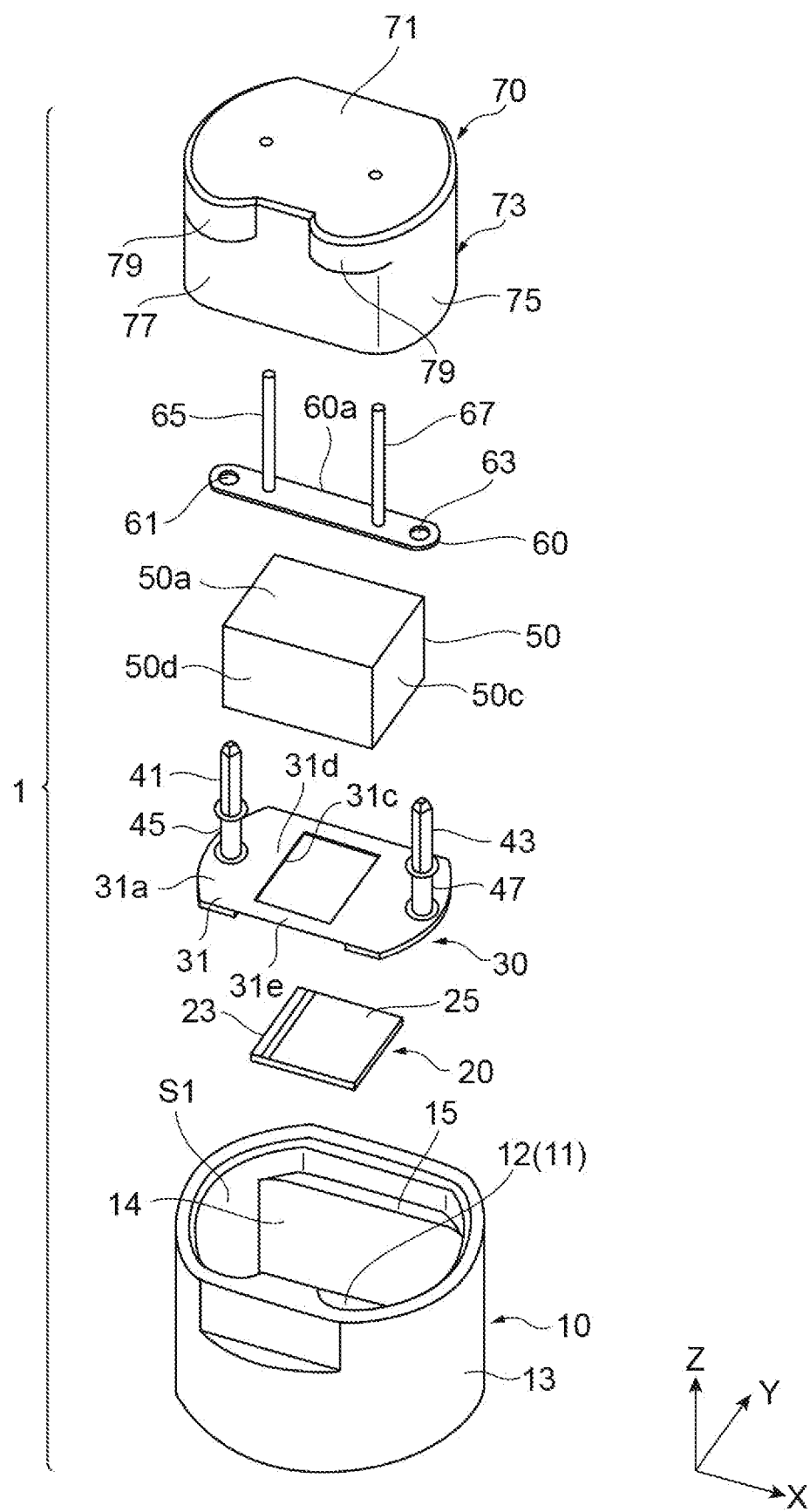
FIG. 2 is an exploded perspective view of the ultrasonic device in FIG. 1.
Figure 3:
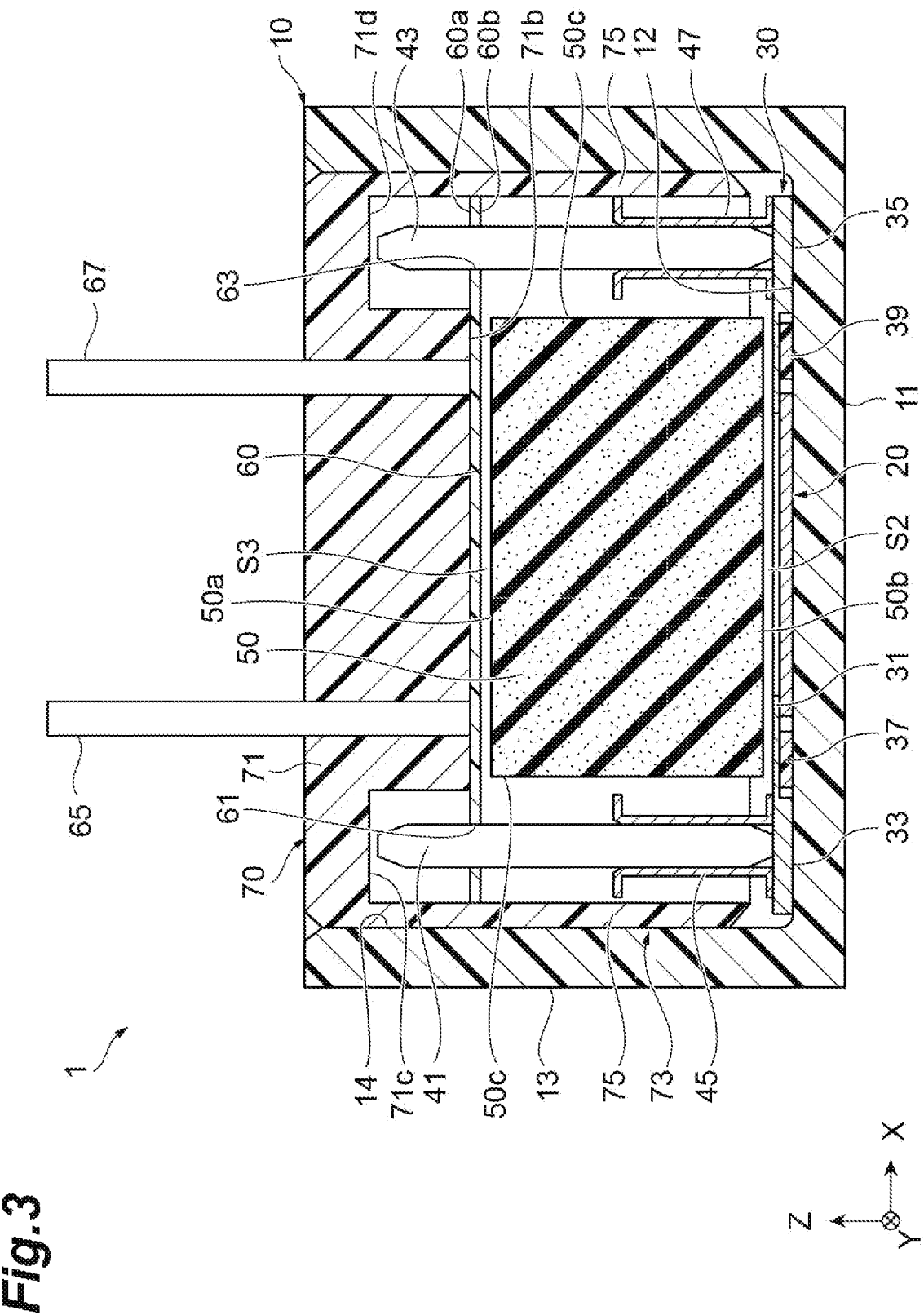
FIG. 3 is a cross-sectional view taken along the line III-III in FIG. 1.
Figure 4:
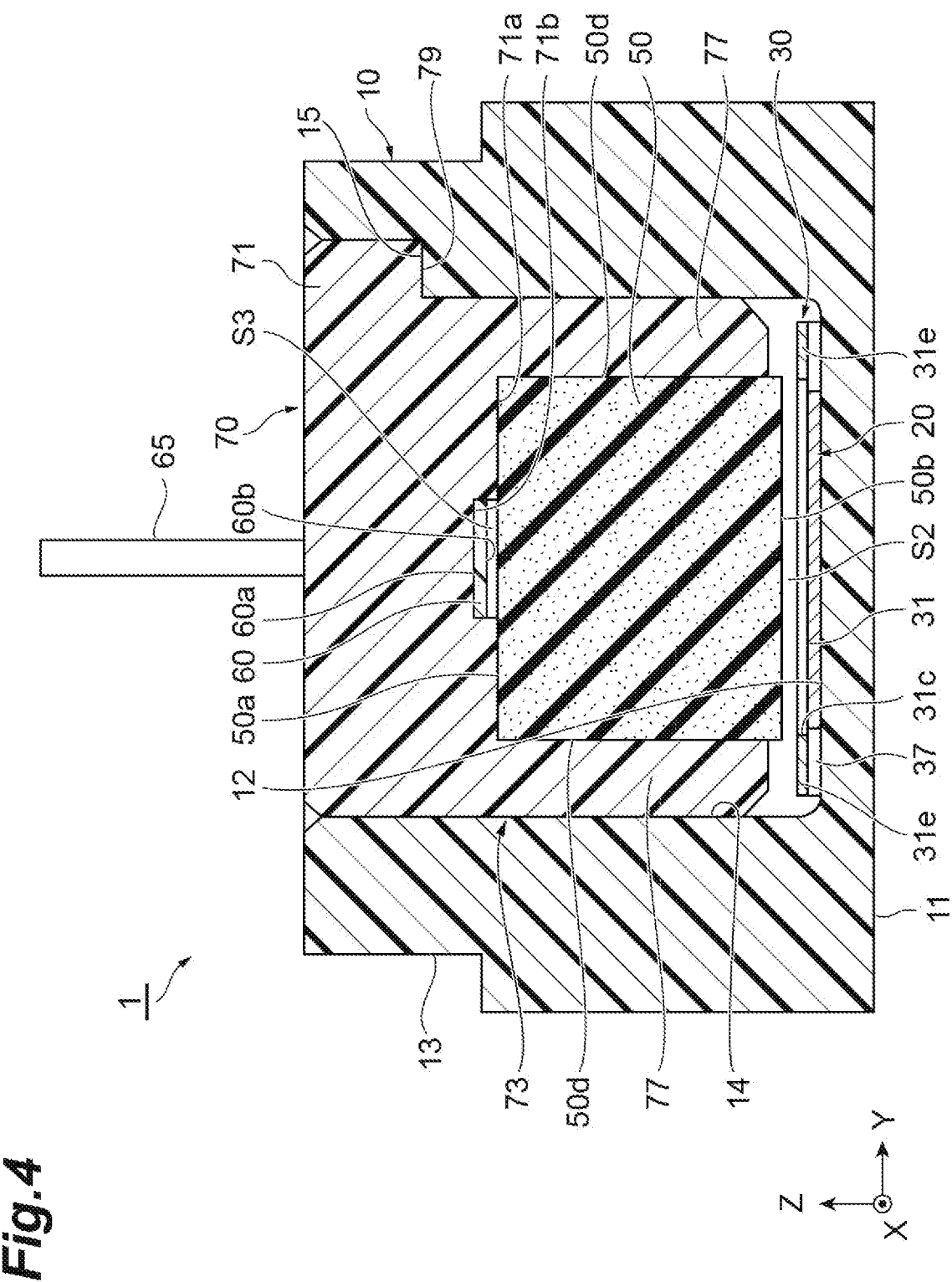
FIG. 4 is a cross-sectional view taken along the line IV-IV in FIG. 1.

A configuration of an ultrasonic device 1 according to the present embodiment will be described with reference to FIGS. 1 to 4. FIG. 1 is a perspective view of an ultrasonic device according to an embodiment. FIG. 2 is an exploded perspective view of the ultrasonic device in FIG. 1. FIG. 3 is a cross-sectional view taken along the line III-III in FIG. 1. FIG. 4 is a cross-sectional view taken along the line IV-IV in FIG. 1.

As shown in FIGS. 1 to 4, the ultrasonic device 1 includes a case 10, a piezoelectric element 20, a wiring member 30, a plurality of pins 41 and 43, a plurality of sleeves 45 and 47, a sound absorbing material 50, a substrate 60, a plurality of pins 65 and 67, and a vibration-proof material 70. The case 10 defines a housing space S1. The piezoelectric element 20, the wiring member 30, the pins 41 and 43, the sound absorbing material 50, the substrate 60, the pins 65 and 67, and the vibration-proof material 70 are disposed in the housing space S1. In the present embodiment, the ultrasonic device 1 constitutes an ultrasonic sensor. The ultrasonic device 1 transmits and receives ultrasonic waves, for example.

The case 10 has a bottom wall 11 and a side wall 13. The side wall 13 extends in a direction intersecting the bottom wall 11. The bottom wall 11 and the side wall 13 define the housing space S1. The direction intersecting the bottom wall 11 may be, for example, a direction orthogonal to the bottom wall 11. The bottom wall 11 and the side wall 13 are integrally formed. The case 10 is a bottomed cylindrical member having one opened end. The case 10 is made of, for example, aluminum (Al). The case 10 may be made of metal other than Al. The case 10 may be made of, for example, an aluminum alloy, stainless steel, or a copper alloy. The aluminum alloy includes, for example, duralumin. The copper alloy includes, for example, brass.

Figure 5:
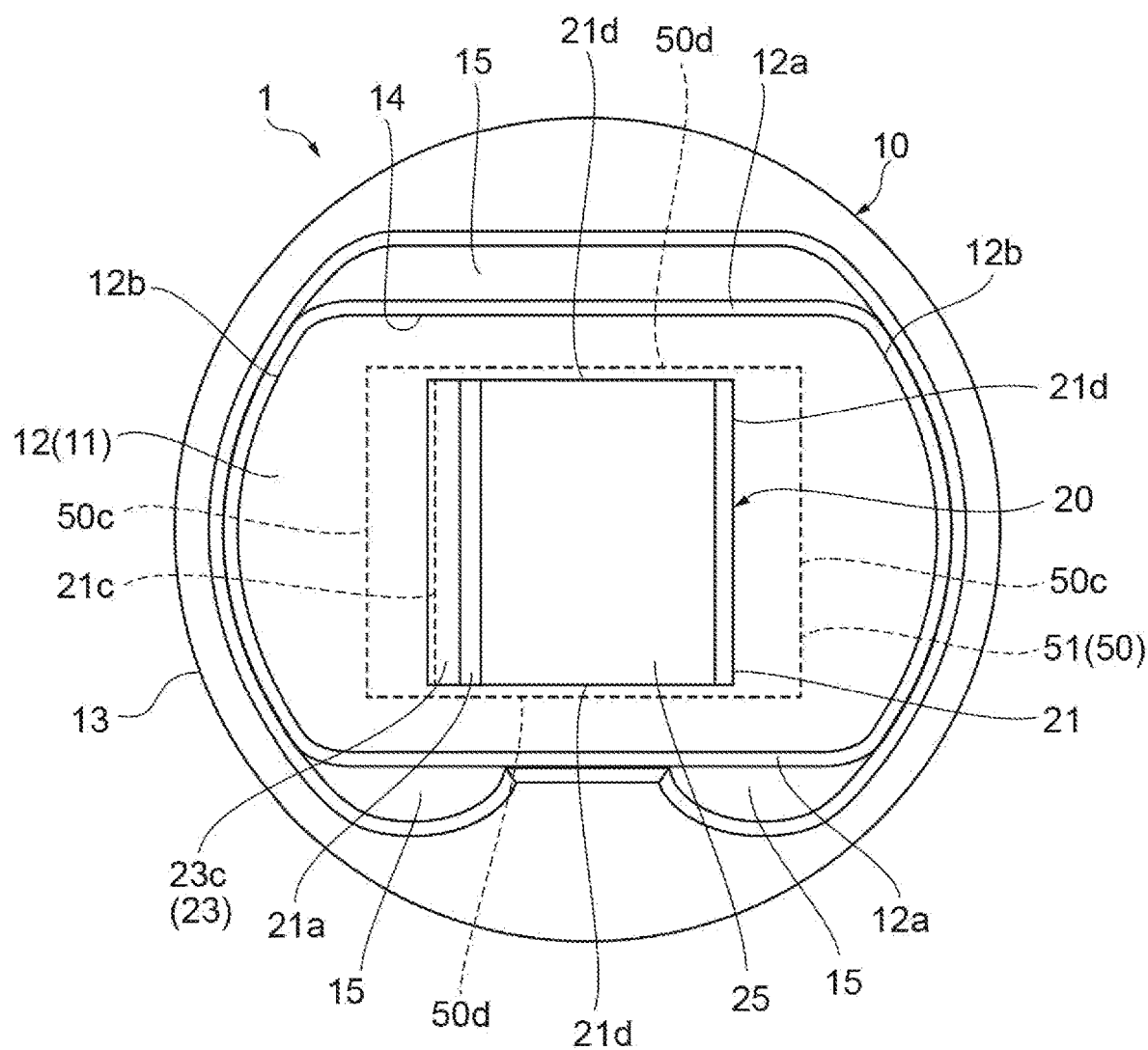
FIG. 5 is a plan view of a case and a piezoelectric element.

FIG. 5 is a plan view of the case and the piezoelectric element. In FIG. 5, the sound absorbing material 50 is shown by a broken line. As also shown in FIG. 5, the bottom wall 11 has a bottom face 12 facing the housing space. The bottom face 12 has a circular shape having a major axis and a minor axis when viewed from a direction intersecting the bottom face 12. In the present embodiment, the bottom face 12 has an oval shape. In the bottom face 12, a direction along the major axis and a direction along the minor axis intersect each other. The direction along the major axis and the direction along the minor axis are, for example, orthogonal to each other. The thickness of the bottom wall 11 is, for example, 0.7 mm or more and 1.5 mm or less. In the present embodiment, the thickness of the bottom wall 11 is 0.9 mm.

In the following, the direction along the major axis of the bottom face 12 is referred to as an X direction, the direction along the minor axis of the bottom face 12 is referred to as a Y direction, and a direction orthogonal to the bottom face 12 is referred to as a Z direction.

The bottom face 12 is defined by a pair of edges 12a each having a linear shape and a pair of edges 12b each having an arc shape. The two edges 12a extend in the X direction and are separated from each other in the Y direction. The two edges 12a are substantially parallel to each other. Each edge 12b connects the ends of the two edges 12a. The circular shape having the major axis and the minor axis may be an elliptical shape. The direction intersecting the bottom face 12 may be, for example, the direction orthogonal to the bottom face 12. The direction intersecting the bottom face 12 may be aligned with the direction intersecting the bottom wall 11.

The side wall 13 has an inner face 14. The bottom face 12 and the inner face 14 constitute an inner face of the case 10. On the inner face 14, a plurality of stepped portions 15 is formed. In the present embodiment, three stepped portions 15 are formed. One stepped portion 15 extends along one edge 12a. The remaining two stepped portions 15 are provided along the other edge 12a and separated from each other. The stepped portions 15 are used to position the vibration-proof material 70 with respect to the case 10.

Figure 6:
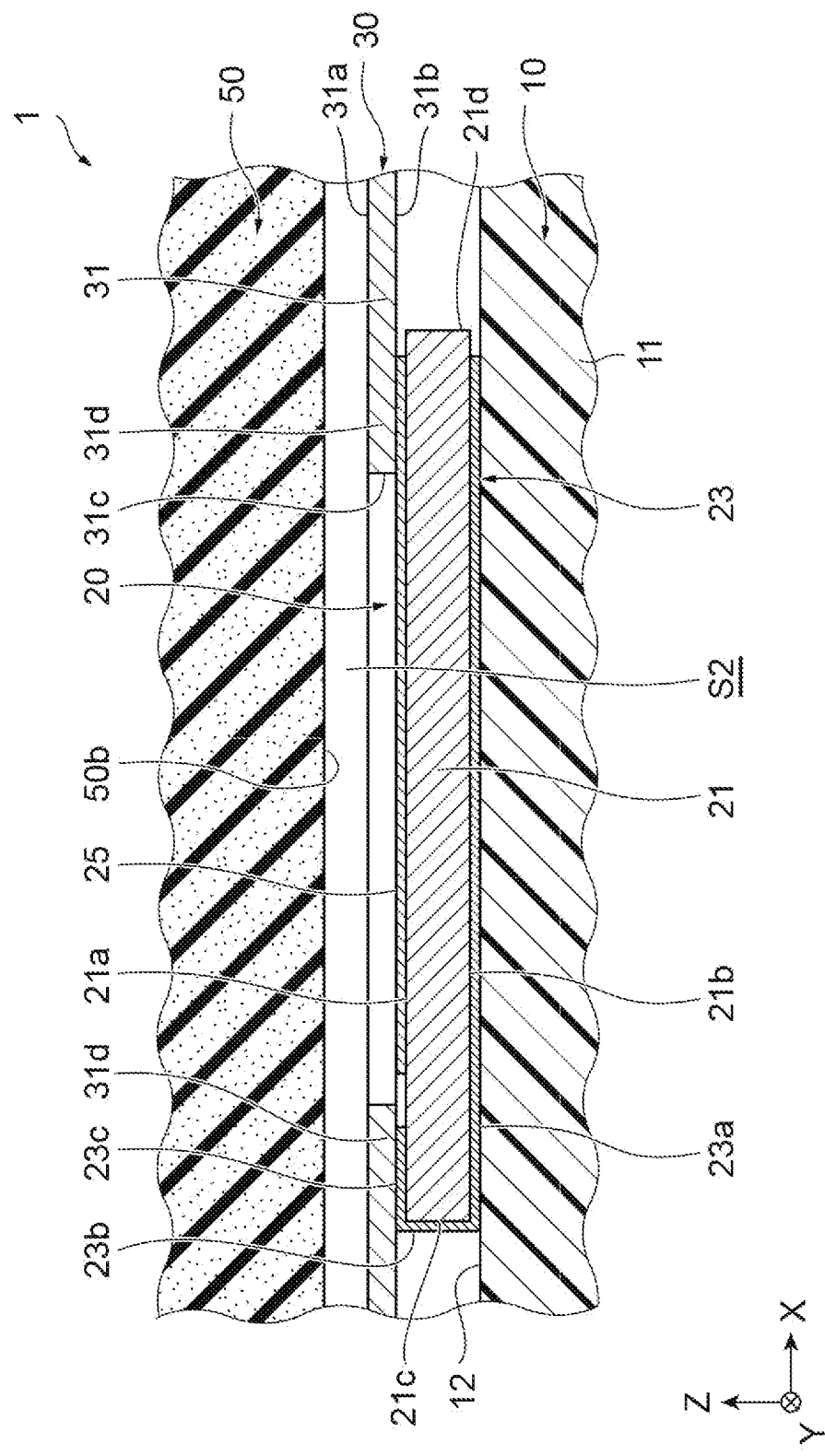
FIG. 6 is a partially enlarged view of FIG. 3.
Figure 7A:
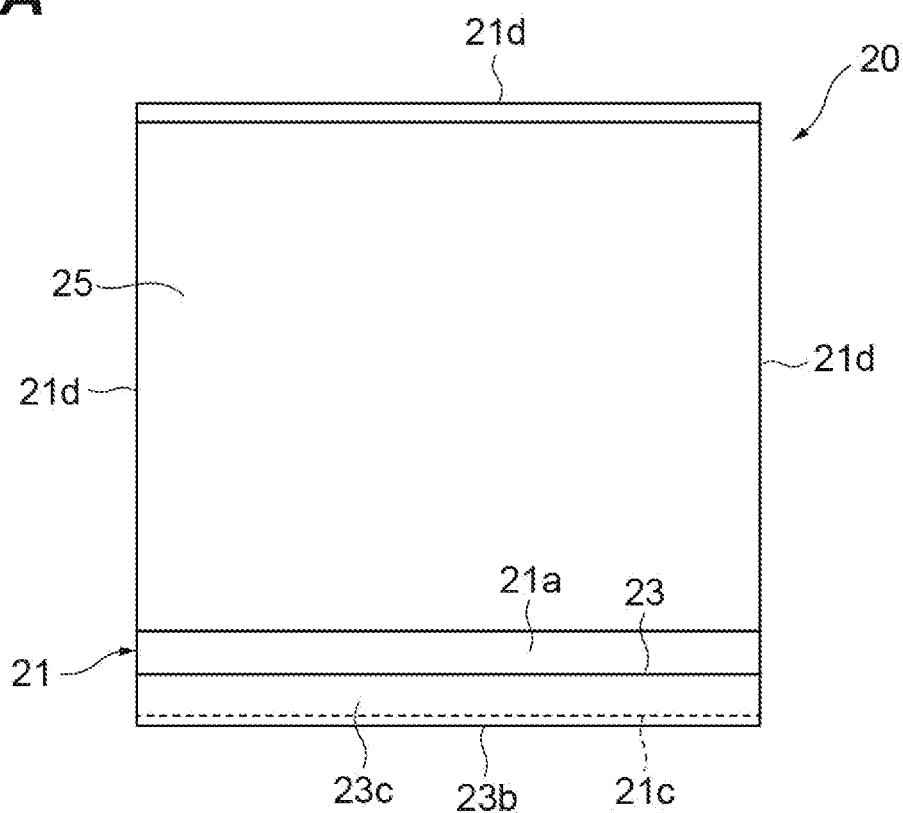
FIGS. 7A and 7B are plan views of the piezoelectric element.
Figure 7B:
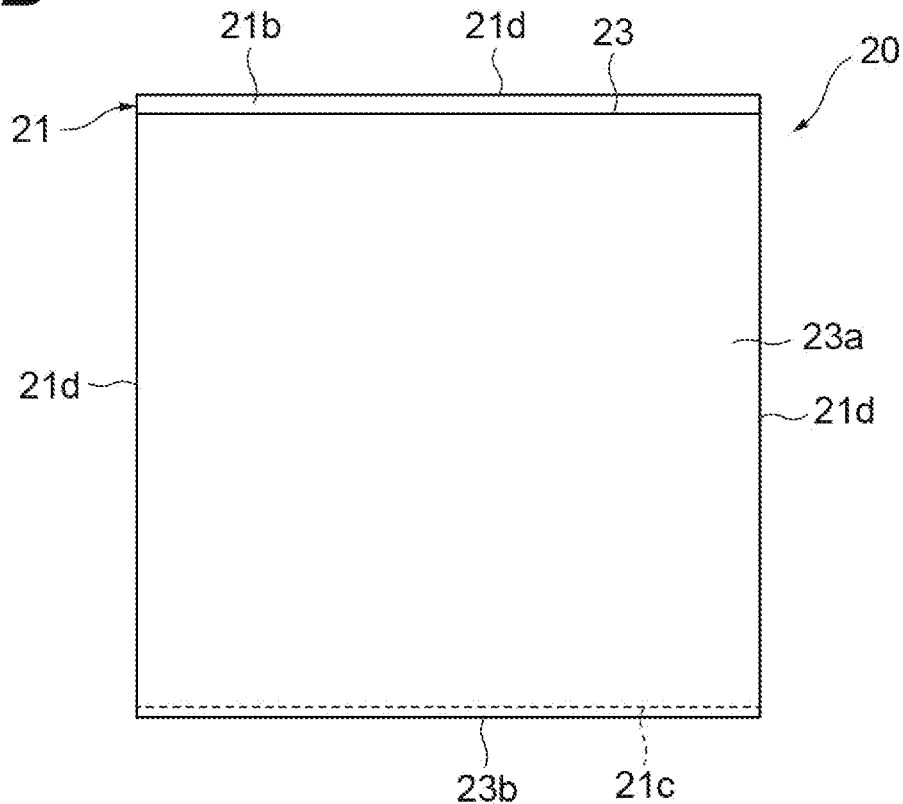

FIG. 6 is a partially enlarged view of FIG. 3. FIGS. 7A and 7B are plan views of the piezoelectric element. As shown in FIGS. 5, 6, 7A, and 7B, the piezoelectric element 20 includes a piezoelectric element body 21 and a plurality of electrodes 23 and 25. In the present embodiment, the piezoelectric element 20 has two electrodes 23 and 25. The piezoelectric element 20 is disposed on the bottom wall 11. The piezoelectric element 20 is fixed to the bottom wall 11 by, for example, bonding.

The piezoelectric element body 21 has a pair of main faces 21a and 21b opposed to each other, and at least one side face 21c. The side face 21c extends in a direction in which the two main faces 21a and 21b are opposed to each other (Z direction) in such a way as to connect the two main faces 21a and 21b. The main face 21b is opposed to the bottom face 12. The piezoelectric element 20 is disposed on the bottom wall 11 in such a way that the main face 21b is opposed to the bottom face 12. The direction in which the two main faces 21a and 21b are opposed to each other is the direction intersecting the bottom wall 11 (bottom face 12). The direction in which the two main faces 21a and 21b are opposed to each other may be the direction orthogonal to the bottom wall 11 (bottom face 12).

The piezoelectric element body 21 has a rectangular parallelepiped shape (rectangular plate shape). The two main faces 21a and 21b each have a rectangular shape. The piezoelectric element body 21 has three side faces 21d in addition to the side face 21c. Each side face 21d also extends in the direction in which the two main faces 21a and 21b are opposed to each other (Z direction) in such a way as to connect the two main faces 21a and 21b. In the present embodiment, the piezoelectric element body 21 has a square shape in a plan view. The piezoelectric element body 21 may have a disk shape. The rectangular parallelepiped shape in this specification includes a rectangular parallelepiped shape in which the corner portions and the ridge portions are chamfered, and a rectangular parallelepiped shape in which the corner portions and the ridge portions are rounded.

The piezoelectric element body 21 is made of a piezoelectric ceramic material. The piezoelectric ceramic material includes, for example, PZT [Pb(Zr, Ti)O$_3$], PT (PbTiO$_3$), PLZT [(Pb, La)(Zr, Ti)O$_3$], or barium titanate (BaTiO$_3$). The piezoelectric element body 21 is made of, for example, a sintered body of a ceramic green sheet containing the above piezoelectric ceramic material. The thickness of the piezoelectric element body 21 is, for example, 150 μm or more and 500 μm or less. In the present embodiment, the thickness of the piezoelectric element body 21 is 200 μm.

The electrode 23 is provided on the main face 21b, the side face 21c, and the main face 21a. The electrode 23 has a portion 23a, a portion 23b, and a portion 23c. The portion 23a is positioned on the main face 21b. The portion 23b is positioned on the side face 21c. The portion 23c is positioned on the main face 21a. The portion 23a and the portion 23b are connected to each other at a ridge portion positioned between the main face 21b and the side face 21c. The portion 23b and the portion 23c are connected to each other at a ridge portion positioned between the main face 21a and the side face 21c. The portions 23a, 23b, and 23c are integrally formed. The portion 23a of the electrode 23 is joined to the bottom wall 11 (bottom face 12).

When viewed from a thickness direction (Z direction) of the piezoelectric element 20 (piezoelectric element body 21), the portion 23a of the electrode 23 is separated from a ridge portion positioned between the side face 21d opposed to the side face 21c and the main face 21b. The main face 21b is exposed along the ridge portion positioned between the side face 21d opposed to the side face 21c and the main face 21b. The portion 23b of the electrode 23 covers the entire side face 21c. Each side face 21d is exposed from the electrode 23.

The electrode 25 is provided on the main face 21a. The electrode 25 is disposed only on the main face 21a. The electrode 25 is separated from the portion 23c of the electrode 23. The main face 21a is exposed between the portion 23c of the electrode 23 and the electrode 25. When viewed from a direction orthogonal to the main face 21a, the electrode 25 is separated from a ridge portion positioned between the side face 21d opposed to the side face 21c and the main face 21a. The main face 21a is exposed along the ridge portion positioned between the side face 21d opposed to the side face 21c and the main face 21a. Each side face 21d is also exposed from the electrode 25. The piezoelectric element body 21 has a region overlapping with the portion 23a of the electrode 23 and the electrode 25 in the Z direction. This region is sandwiched between the portion 23a of the electrode 23 and the electrode 25 in the Z direction. In the piezoelectric element 20, this region constitutes a piezoelectrically active region.

Each of the electrodes 23 and 25 is in contact with the surface of the piezoelectric element body 21. The thickness of each of the electrodes 23 and 25 is 1.5 μm or less. Each of the electrodes 23 and 25 includes a laminate formed by, for example, a chromium (Cr) layer, a nickel-copper alloy (Ni—Cu) layer, and a gold (Au) layer. Each of the electrodes 23 and 25 may contain silver (Ag), titanium (Ti), platinum (Pt), a silver-palladium alloy (Ag—Pd), or a nickel-chromium alloy (Ni—Cr). Each of the electrodes 23 and 25 is formed on the surface of the piezoelectric element body 21 by, for example, sputtering.

As also shown in FIG. 5, the piezoelectric element 20 is disposed on the bottom wall 11 (bottom face 12) in such a way that the side face 21c is along the Y direction. A region of the main face 21a exposed from the electrodes 23 and 25 extends in the Y direction. While the piezoelectric element 20 is disposed in the case 10, the electrode 25 and the portion 23c of the electrode 23 are separated from each other in the X direction. In the present embodiment, a direction in which the side face 21c is opposed to the side face 21d is the X direction. For example, the piezoelectric element 20 is disposed substantially at the center of the bottom face 12 in the X direction and the Y direction.

The piezoelectric element body 21 has a square shape in a plan view in the present embodiment, but the piezoelectric element body 21 may have a rectangular shape in a plan view. In this case, a direction along the long side of the piezoelectric element body 21 is the longitudinal direction, and a direction along the short side of the piezoelectric element body 21 is the lateral direction. The piezoelectric element 20 may be disposed on the bottom wall 11 in such a way that the longitudinal direction of the piezoelectric element body 21 is along the X direction.

The wiring member 30 is disposed on the piezoelectric element 20. The wiring member 30 is electrically connected to the piezoelectric element 20. The wiring member 30 is, for example, a flexible printed circuit (FPC) or a flexible flat cable (FFC). The wiring member 30 has a base 31 and two leg portions 33 and 35.

The base 31 is a plate-like member having substantially the same shape as the bottom face 12 in a plan view. The base 31 is slightly smaller than the bottom face 12 in a plan view and is disposed in such a way as to be separated from the inner face 14. As also shown in FIG. 6, the base 31 has a pair of main faces 31a and 31b opposed to each other in the Z direction. The wiring member 30 is disposed in the housing space S1 in such a way that the main face 31b is opposed to the piezoelectric element body 21.

The base 31 is formed with an opening 31c for exposing a part of the piezoelectric element 20. In the present embodiment, the opening 31c has a rectangular shape. The opening 31c has a pair of linear edge portions 31d opposed to each other in the X direction, and a pair of linear edge portions 31e opposed to each other in the Y direction. One edge portion 31d covers the entire portion 23c of the electrode 23. The other edge portion 31d covers a part of the electrode 25.

The base 31 is, for example, a resin layer made of resin such as polyimide resin. On the base 31, a plurality of conductor layers (not shown) is disposed. The conductor layers are bonded to the base 31. In the present embodiment, two conductor layers are disposed. One conductor layer connects the electrode 23 and the pin 41. The other conductor layer connects the electrode 25 and the pin 43.

The leg portions 33 and 35 are provided on the main face 31b (see FIG. 6) and are in contact with the bottom face 12. The leg portions 33 and 35 are disposed on the respective sides of the piezoelectric element 20 in such a way as to sandwich the piezoelectric element 20 in the X direction when viewed from the direction orthogonal to the bottom face 12 (Z direction). The leg portions 33 and 35 extend in the Y direction along the respective edges 12b (see FIG. 5) of the bottom face 12. The leg portion 33 is opposed to the portion 23b of the electrode 23 (the side face 21c). The leg portion 35 is opposed to the side face 21d opposed to the side face 21c.

The wiring member 30 is fixed to the bottom wall 11 (bottom face 12) by insulating hot melt resins 37 and 39. The hot melt resin 37 is disposed, on the main face 31b, between the leg portion 33 and the portion 23b. The hot melt resin 39 is disposed, on the main face 31b, between the leg portion 35 and the side face 21d. The hot melt resins 37 and 39 are bonded to the main face 31b and the bottom face 12.

The pin 41 is solder-connected to the one conductor layer provided on the base 31. The pin 41 may be connected to the one conductor layer by a conductive adhesive. The pin 41 is electrically connected to the electrode 23 through the one conductor layer. The pin 43 is solder-connected to the other conductor layer provided on the base 31. The pin 43 may be connected to the other conductor layer by a conductive adhesive. The pin 43 is electrically connected to the electrode 25 through the other conductor layer.

The pins 41 and 43 are disposed on the main face 31a in such a way as to be separated from each other in the X direction. The pins 41 and 43 extend from the main face 31a in the Z direction. In the present embodiment, the pins 41 and 43 have the same shape. Each of the pins 41 and 43 is made of, for example, metal. Each of the pins 41 and 43 is made of, for example, brass. The surface of each of the pins 41 and 43 may be formed with a plating layer (not shown). The plating layer may be formed by, for example, nickel plating and tin plating. In this case, the plating layer has a two-layer structure.

The pin 41 is held by the sleeve 45. The pin 43 is held by the sleeve 47. Each of the sleeves 45 and 47 is a cylindrical member having flanges at both ends. In the present embodiment, the sleeves 45 and 47 have the same shape. Each of the sleeves 45 and 47 is made of resin. Each of the sleeves 45 and 47 is made of, for example, metal such as phosphorus-deoxidized copper (PDC) or brass. When the sleeves 45 and 47 are made of metal, the sleeves 45 and 47 in addition to the pins 41 and 43 can be joined to the conductor layers of the wiring member 30, which increases the connection reliability. Each of the sleeves 45 and 47 may be made of polyether ether ketone (PEEK) resin, polybutylene terephthalate (PBT) resin, or polyphenylene sulfide (PPS) resin.

The flange on one end side of each of the sleeves 45 and 47 is joined to the main face 31a. The sleeve 45 is disposed at a position overlapping the leg portion 33 as viewed from the axial direction (Z direction). The sleeve 47 is disposed at a position overlapping the leg portion 35 as viewed from the axial direction (Z direction). The length of each of the sleeves 45 and 47 in the axial direction is shorter than the length of each of the pins 41 and 43 in the axial direction. The pins 41 and 43 protrude from the respective sleeves 45 and 47.

The sound absorbing material 50 is disposed on the piezoelectric element 20. The sound absorbing material 50 is disposed between the pins 41 and 43. The sound absorbing material 50 is disposed in the housing space S1. The sound absorbing material 50 has, for example, a rectangular parallelepiped shape. The sound absorbing material 50 has a pair of main faces 50a and 50b opposed to each other in the Z direction, a pair of side faces 50c opposed to each other in the X direction, and a pair of side faces 50d opposed to each other in the Y direction.

The main face 50a is opposed to the substrate 60. The main face 50b is opposed to the piezoelectric element 20. In the present embodiment, each of the main faces 50a and 50b has a rectangular shape having a pair of long sides and a pair of short sides. The long sides of the main faces 50a and 50b extend in the X direction. The short sides of the main faces 50a and 50b extend in the Y direction. The side faces 50c are opposed to the respective pins 41 and 43. The side faces 50c are separated from the respective pins 41 and 43. The side faces 50d are in contact with the vibration-proof material 70.

The sound absorbing material 50 is separated from the piezoelectric element 20. Between the piezoelectric element 20 and the sound absorbing material 50 (main face 50b), a space S2 is formed. The space S2 is a part of the housing space S1. The thickness of the space S2 (the length in the Z direction) is, for example, 0.5 mm or more and 1.0 mm or less. That is, the sound absorbing material 50 and the piezoelectric element 20 are separated from each other by 0.5 mm or more and 1.0 mm or less in the Z direction. The sound absorbing material 50 is also separated from the wiring member 30.

As also shown in FIG. 5, the sound absorbing material 50 overlaps the entire piezoelectric element 20 when viewed from the thickness direction of the piezoelectric element 20 (Z direction). That is, the piezoelectric element 20 is positioned inside an outer edge 51 of the sound absorbing material 50 when viewed from the Z direction. Accordingly, reverberation of ultrasonic components is further reduced. The piezoelectric element 20 is positioned substantially at the center of the sound absorbing material 50 in the X direction and the Y direction when viewed from the Z direction.

Figure 8A:
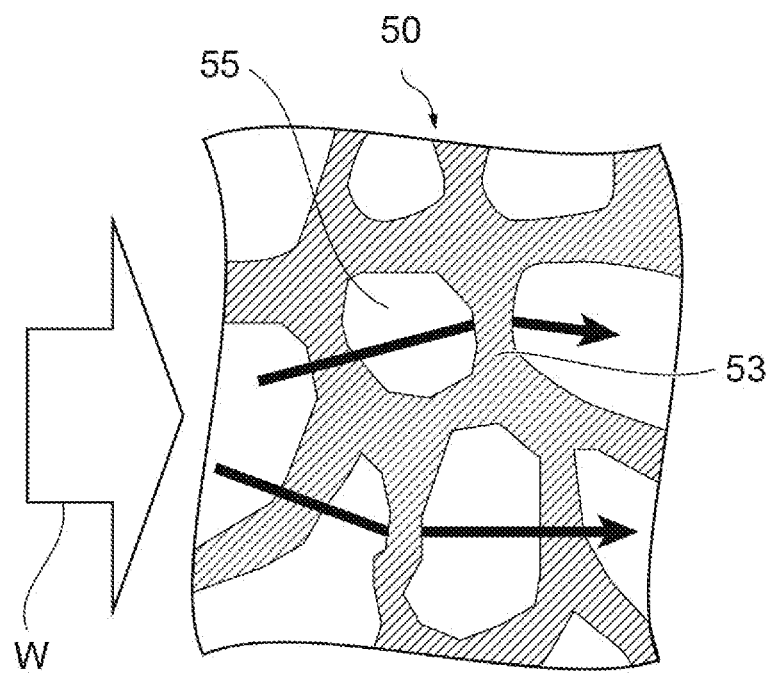
FIGS. 8A and 8B are schematic diagrams showing energy attenuation of sound by a sound absorbing material.
Figure 8B:
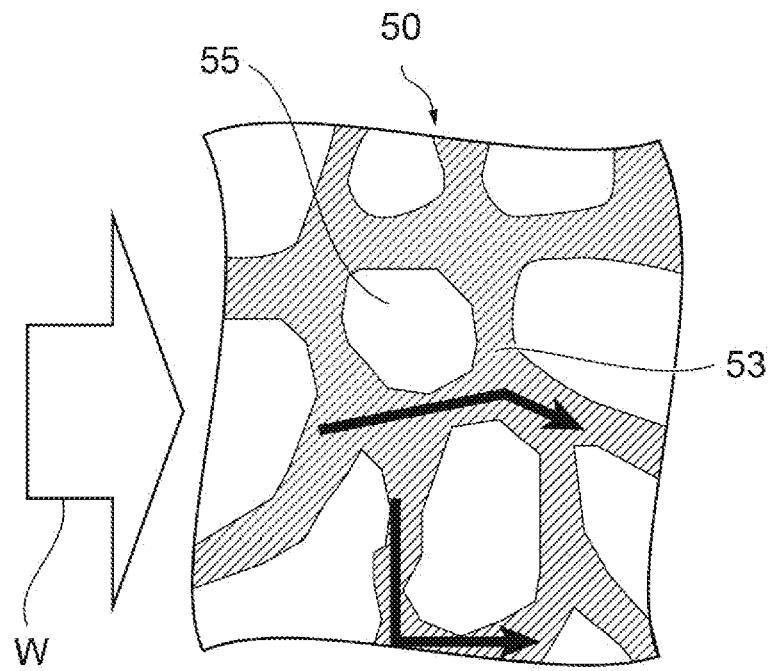

The sound absorbing material 50 is made of, for example, a foaming material (bubble structure) mainly containing thermoplastic resin. The thermoplastic resin includes, for example, ethylene-propylene-diene monomer (EPDM). As shown in FIGS. 8A and 8B, the sound absorbing material 50 includes a skeleton 53 and a plurality of pores (bubbles) 55.

FIGS. 8A and 8B are schematic diagrams showing energy attenuation of sound by the sound absorbing material. Energy attenuation of sound by the sound absorbing material 50 includes energy attenuation of air propagation sound and energy attenuation of solid propagation sound. FIG. 8A schematically shows energy attenuation of air propagation sound. As shown in FIG. 8A, when a sound wave W passes through the pores 55 of the sound absorbing material, the energy of the sound wave W is attenuated by the friction (or viscosity) of the air. FIG. 8B schematically shows energy attenuation of solid propagation sound. As shown in FIG. 8B, when the sound wave W propagates through the skeleton 53 of the sound absorbing material, the energy of the sound wave W is attenuated by the skeleton 53. The energy attenuation of air propagation sound is greater than the energy attenuation of solid propagation sound.

The substrate 60 is disposed in such a way as to be opposed to the piezoelectric element 20, sandwiching the sound absorbing material 50 therebetween. The substrate 60 is disposed on the main face 50a. The substrate 60 is disposed in the housing space S1. The substrate 60 is a plate-like member. The substrate 60 has a pair of main faces 60a and 60b opposed to each other in the Z direction. The main face 60b is opposed to the main face 50a.

The substrate 60 is separated from the sound absorbing material 50. Between the substrate 60 (main face 60b) and the sound absorbing material 50 (main face 50a), a space S3 is formed. The space S3 is a part of the housing space S1. The space S3 is defined by the substrate 60, the sound absorbing material 50, and the vibration-proof material 70. The thickness of the space S3 (length in the Z direction) is thinner than the thickness of the space S2. The thickness of the space S3 is, for example, 0.2 mm or more and 0.45 mm or less. That is, the substrate 60 and the sound absorbing material 50 are separated from each other by 0.2 mm or more and 0.45 mm or less in the Z direction.

Each of the main faces 60a and 60b has an oval shape. The major axis direction of each of the main faces 60a and 60b is along the Y direction. The minor axis direction of each of the main faces 60a and 60b is along the X direction. A pair of edges of each of the main faces 60a and 60b in the minor axis direction is curved in such a way as to bulge outward and has an arc shape. The substrate 60 is provided with insertion holes 61 and 63 through which the pins 41 and 43 are inserted. The insertion holes 61 and 63 are formed at the respective ends of the substrate 60 in the X direction and each have a circular shape. The two edges of each of the main faces 60a and 60b in the minor axis direction are curved along the respective insertion holes 61 and 63.

The substrate 60 is electrically connected to the piezoelectric element 20. The substrate 60 is made of, for example, a glass epoxy substrate. On the substrate 60, a plurality of conductor layers (not shown) is disposed. The conductor layers are bonded to the substrate 60. In the present embodiment, two conductor layers are disposed. One conductor layer connects the pin 41 and the pin 65. The other conductor layer connects the pin 43 and the pin 67.

The pins 41 and 65 are solder-connected to the one conductor layer of the substrate 60. The pins 41 and 65 may be connected to the one conductor layer of the substrate 60 by a conductive adhesive. The pins 41 and 65 are electrically connected to each other through the one conductor layer of the substrate 60. The pins 43 and 67 are solder-connected to the other conductor layer of the substrate 60. The pins 43 and 67 may be connected to the other conductor layer of the substrate 60 by a conductive adhesive. The pins 43 and 67 are electrically connected to each other through the other conductor layer of the substrate 60.

The pins 65 and 67 are disposed on the main face 60a in such a way as to be separated from each other in the X direction. The pins 65 and 67 extend from the main face 60a in the Z direction and pass through the vibration-proof material 70. The pins 65 and 67 are disposed between the pins 41 and 43 in the X direction. In the present embodiment, the pins 65 and 67 have the same shape.

The pins 65 and 67 are made of, for example, metal. The pins 65 and 67 are made of, for example, brass. The surface of each of the pins 65 and 67 may be formed with a plating layer (not shown). The plating layer may be formed by, for example, nickel plating and tin plating. In this case, the plating layer has a two-layer structure.

The vibration-proof material 70 is disposed in contact with the inner face (inner face 14) of the case 10 to suppress vibration of the case 10. The vibration-proof material 70 is disposed around the sound absorbing material 50. The vibration-proof material 70 has a lid body 71 and a frame body 73. The lid body 71 seals the opening of the case 10 while the piezoelectric element 20, the wiring member 30, the pins 41 and 43, the sleeves 45 and 47, the sound absorbing material 50, and the substrate 60 are housed in the case 10. The lid body 71 seals the housing space S1. The tip ends of the pins 65 and 67 protrude from the lid body 71.

As shown in FIG. 4, an inner face 71a of the lid body 71 is provided with a recessed portion 71b in which the substrate 60 is disposed. The substrate 60 is to be disposed in the recessed portion 71b while the main face 60a is opposed to a bottom face of the recessed portion 71b. The bottom face of the recessed portion 71b has a shape matching the main face 60a. The bottom face of the recessed portion 71b has the same shape as the main face 60a. To assemble the ultrasonic device 1, for example, the substrate 60 is disposed on the bottom face of the recessed portion 71*b*, and then the sound absorbing material 50 is disposed on the inner face 71*a*. Since the depth of the recessed portion 71*c* is deeper than the thickness of the substrate 60, the space S3 is formed between the substrate 60 and the sound absorbing material 50.

The bottom face of the recessed portion 71*b* is provided with a recessed portion 71*c* in which the pin 41 is to be housed, and a recessed portion 71*d* in which the pin 43 is to be housed. The recessed portions 71*c* and 71*d* each have, for example, a circular cross section. The diameter of each of the recessed portions 71*c* and 71*d* is longer than the diameter of each of the pins 41 and 43. The inner faces of the recessed portions 71*c* and 71*d* are separated from the respective pins 41 and 43. The recessed portions 71*c* and 71*d* are provided at the respective ends of the bottom face of the recessed portion 71*b* in the X direction.

The frame body 73 extends in a direction intersecting the lid body 71. The direction intersecting the lid body 71 may be, for example, a direction orthogonal to the lid body 71. The lid body 71 and the frame body 73 are integrally formed. The vibration-proof material 70 is a cylindrical member having one closed end and the other opened end in the axial direction. The vibration-proof material 70 is fitted in the case 10. The vibration-proof material 70 is press-fitted into the case 10. The frame body 73 extends from the lid body 71 to the inside of the case 10 along the Z direction. The frame body 73 is separated from the bottom face 12. The frame body 73 is in contact with the inner face 14 of the case 10.

The frame body 73 surrounds the sound absorbing material 50. The sound absorbing material 50 protrudes toward the piezoelectric element 20 from the vibration-proof material 70 (frame body 73) in the thickness direction of the piezoelectric element 20 (Z direction). The distance between the frame body 73 and the piezoelectric element 20 in the Z direction is longer than the distance between the sound absorbing material 50 and the piezoelectric element 20 in the Z direction (the thickness of the space S2).

The frame body 73 has a pair of side portions 75 and a pair of side portions 77. The two side portions 75 are opposed to each other in the X direction, sandwiching the sound absorbing material 50 therebetween. The two side portions 77 are opposed to each other in the Y direction, sandwiching the sound absorbing material 50 therebetween. The two side portions 75 are opposed to the respective side faces 50*c* of the sound absorbing material 50. The two side portions 75 are separated from the sound absorbing material 50.

The two side portions 77 sandwich and hold the sound absorbing material 50. Between the two side portions 77, the sound absorbing material 50 is fitted. The two side portions 77 compress the sound absorbing material 50. The sound absorbing material 50 presses the two side portions 77 with the repulsive force against the compression. The two side portions 77 are in contact with the respective side faces 50*d* of the sound absorbing material 50.

The vibration-proof material 70 further has a plurality of overhanging portions 79 overhangs from the lid body 71 toward the inner face 14. The overhanging portions 79 are provided, in the lid body 71, at positions corresponding to the stepped portions 15 of the case 10. The overhanging portions 79 are disposed on the corresponding stepped portions 15. The vibration-proof material 70 is positioned with respect to the case 10 by engaging the overhanging portions 79 with the stepped portions 15.

The vibration-proof material 70 is an elastic body and suppresses reverberation by elasticity. The vibration-proof material 70 is made of resin. The vibration-proof material 70 is a non-foaming material and has a density higher than the density of the sound absorbing material 50. The vibration-proof material 70 is made of, for example, silicone rubber. The vibration-proof material 70 is made of, for example, room temperature vulcanizing (RTV) silicone rubber.

The ultrasonic sensor transmits an output wave and receives the output wave having bounced back from an inspection object. When the ultrasonic sensor is close to an inspection object and the distance from the ultrasonic sensor to the inspection object is short, the voltage of the reverberation component generated when an output wave is transmitted and the reception voltage of the output wave having bounced back from the inspection object interfere with each other. This can make it difficult for the ultrasonic sensor to detect the reception voltage.

In the ultrasonic device 1, the space S2 is formed between the piezoelectric element 20 and the sound absorbing material 50. Thus, reverberation of ultrasonic components is not directly transmitted from the piezoelectric element 20 to the skeleton 53 of the sound absorbing material 50. Accordingly, it is possible to further reduce reverberation of the ultrasonic components.

As described above, although the energy of the sound wave W is attenuated also by the skeleton 53, the energy attenuation of the solid propagation sound is smaller than the energy attenuation of the air propagation sound. Thus, reverberation of the ultrasonic components is more easily reduced when the piezoelectric element 20 and the sound absorbing material 50 are separated from each other than when the piezoelectric element 20 and the sound absorbing material 50 are brought into contact with each other.

When the piezoelectric element 20 and the sound absorbing material 50 are brought into contact with each other, the piezoelectric element 20 is excessively constrained, and as a result, the vibration characteristics of the piezoelectric element 20 can be deteriorated. In the present embodiment, since the piezoelectric element 20 and the sound absorbing material 50 are separated from each other, the piezoelectric element 20 is not excessively constrained as described above. Thus, it is possible to obtain good vibration characteristics.

In the ultrasonic device 1, the space S3 is formed between the substrate 60 and the sound absorbing material 50. Thus, reverberation of the ultrasonic components is not directly transmitted from the skeleton 53 of the sound absorbing material 50 to the substrate 60. Accordingly, it is possible to further reduce reverberation of the ultrasonic components.

In the ultrasonic device 1, the sound absorbing material 50 protrudes toward the piezoelectric element 20 from the vibration-proof material 70 in the thickness direction of the piezoelectric element 20 (Z direction). Thus, the surface area of the sound absorbing material 50 exposed from the vibration-proof material 70 is increased, and it is possible to enhance the sound absorbing effect by the sound absorbing material 50. As a result, it is possible to further reduce reverberation of the ultrasonic components.

The embodiment of the present disclosure has been described above; the present invention is not necessarily limited to the above described embodiment, and can be variously changed without departing from the gist.

Figure 9:
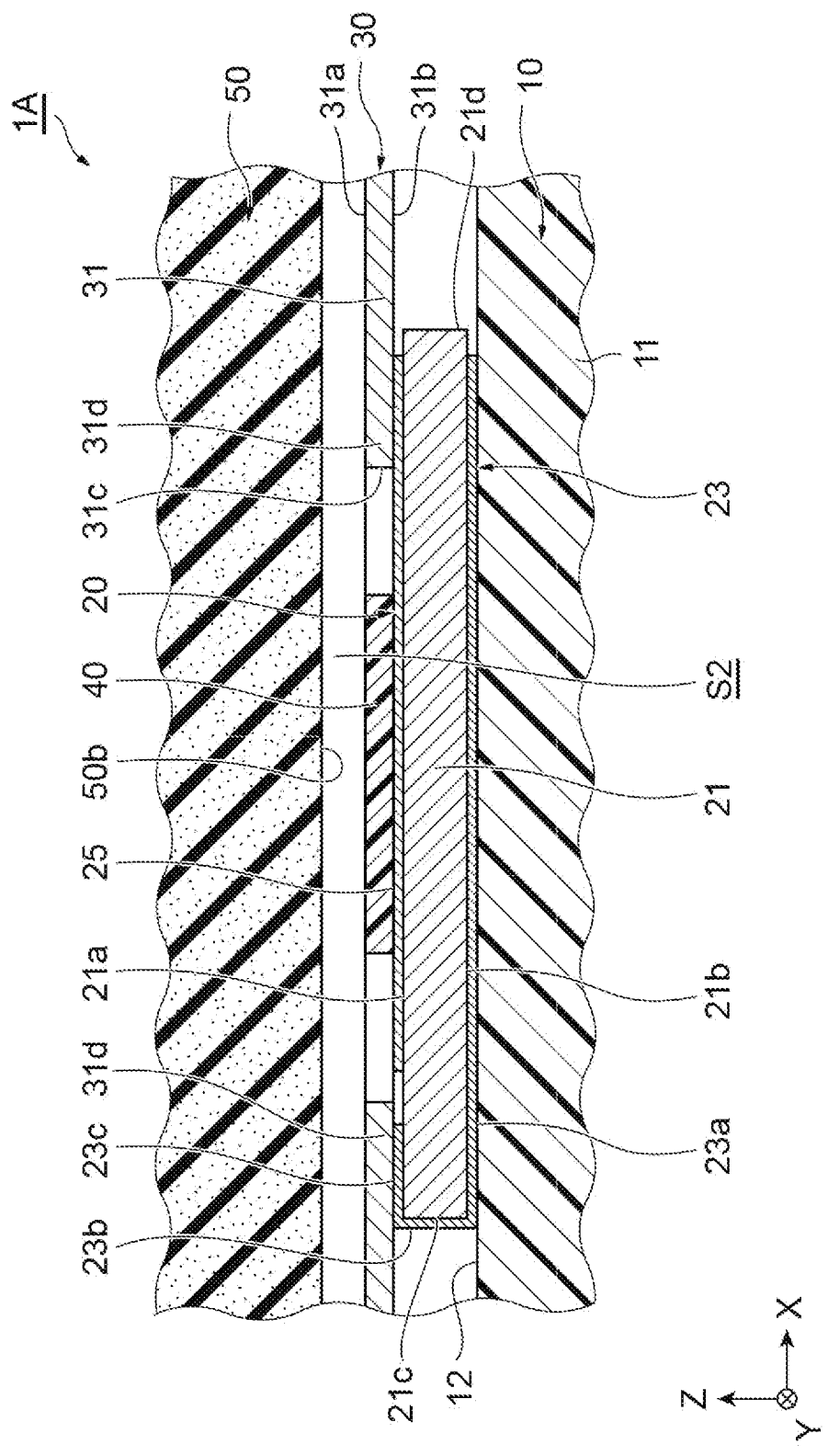
FIG. 9 is a partially enlarged cross-sectional view of an ultrasonic device according to a modification.

FIG. 9 is a cross-sectional view of an ultrasonic device according to a modification. As shown in FIG. 9, the ultrasonic device 1 may further include a damping material 40 disposed in the space S2 in such a way as to be separated from the sound absorbing material 50. The damping material 40 is disposed on the piezoelectric element 20. The damping material 40 is disposed (applied) on the electrode 25. The damping material 40 is disposed in the opening 31c of the wiring member 30. The damping material 40 is separated from the wiring member 30 when viewed from the thickness direction of the piezoelectric element 20 (Z direction). The damping material 40 is not in contact with an inner face of the opening 31c. The thickness of the damping material 40 is equal to the thickness of the base 31 of the wiring member 30. The damping material 40 is, for example, an elastic body such as rubber.

The ultrasonic device 1 may only transmit ultrasonic waves. The ultrasonic device 1 may only receive ultrasonic waves.

The piezoelectric element 20 may have one or a plurality of internal electrodes disposed in the piezoelectric element body 21. In this case, the piezoelectric element body 21 may have a plurality of piezoelectric layers, and the internal electrodes and the piezoelectric layers may be alternately disposed.

In the thickness direction of the piezoelectric element 20 (Z direction), the sound absorbing material 50 may be recessed to the side opposite to the piezoelectric element 20 from the vibration-proof material 70. The main face 50b of the sound absorbing material 50 may be positioned in the same plane as the tip end of the vibration-proof material 70 in the Z direction.

The thickness of the space S3 may be thicker than the thickness of the space S2 or may be equal to the thickness of the space S2. In the ultrasonic device 1, at least the space S2 is only required to be formed, and the space S3 may not be formed.

What is claimed is:

1. An ultrasonic device comprising:
a case defining a housing space;
a piezoelectric element disposed in the housing space;
a sound absorbing material disposed on the piezoelectric element and made of a foaming material;
a substrate disposed in the housing space in such a way as to be opposed to the piezoelectric element via the sound absorbing material and electrically connected to the piezoelectric element, and
a vibration-proof material disposed around the sound absorbing material and being in contact with an inner face of the case, wherein
a first space is formed between the piezoelectric element and the sound absorbing material, and
a second space is formed between the substrate and the sound absorbing material.

2. The ultrasonic device according to claim 1, wherein the second space has a thickness thinner than a thickness of the first space.

3. The ultrasonic device according to claim 1, wherein the substrate is made of glass epoxy.

4. The ultrasonic device according to claim 1, wherein the substrate includes a pair of main faces each having an oval shape.

5. The ultrasonic device according to claim 1, further comprising a damping material disposed in the first space in such a way as to be separated from the sound absorbing material.

6. The ultrasonic device according to claim 5, wherein the damping material is an elastic body.

7. The ultrasonic device according to claim 5, wherein the damping material is provided in contact with the piezoelectric element.

8. The ultrasonic device according to claim 1, wherein the piezoelectric element is positioned inside an outer edge of the sound absorbing material when viewed from a thickness direction of the piezoelectric element.

9. The ultrasonic device according to claim 1, wherein the sound absorbing material protrudes toward the piezoelectric element from the vibration-proof material in a thickness direction of the piezoelectric element.

10. The ultrasonic device according to claim 1, wherein
the case includes a bottom wall on which the piezoelectric element is disposed, and
the piezoelectric element is fixed to the bottom wall by bonding.

11. The ultrasonic device according to claim 1, wherein
the piezoelectric element includes a piezoelectric element body and a plurality of electrodes,
the piezoelectric element body includes a main face facing the first space, and
the plurality of electrodes is disposed on the main face in such a way as to be separated from each other.

12. The ultrasonic device according to claim 1, wherein the sound absorbing material is made of a foaming material containing thermoplastic resin.

13. The ultrasonic device according to claim 1, wherein the vibration-proof material includes a lid body sealing an opening of the case.

14. The ultrasonic device according to claim 1, wherein the vibration-proof material is an elastic body.

15. The ultrasonic device according to claim 1, wherein the vibration-proof material has a density higher than a density of the sound absorbing material.

16. The ultrasonic device according to claim 1, further comprising:
a wiring member disposed on the piezoelectric element and electrically connected to the piezoelectric element, wherein
the wiring member is a flexible printed circuit or a flexible flat cable.

17. The ultrasonic device according to claim 16, wherein the wiring member is bonded to the case with insulating resin.

18. The ultrasonic device according to claim 16, wherein the first space is formed between the wiring member and the sound absorbing material.

19. The ultrasonic device according to claim 16, wherein the wiring member is formed with an opening for exposing a part of the piezoelectric element.

* * * * *